March 1, 1932. H. F. MARANVILLE 1,847,349
AIRBAG INSERTING MACHINE
Filed May 10, 1930  4 Sheets-Sheet 3

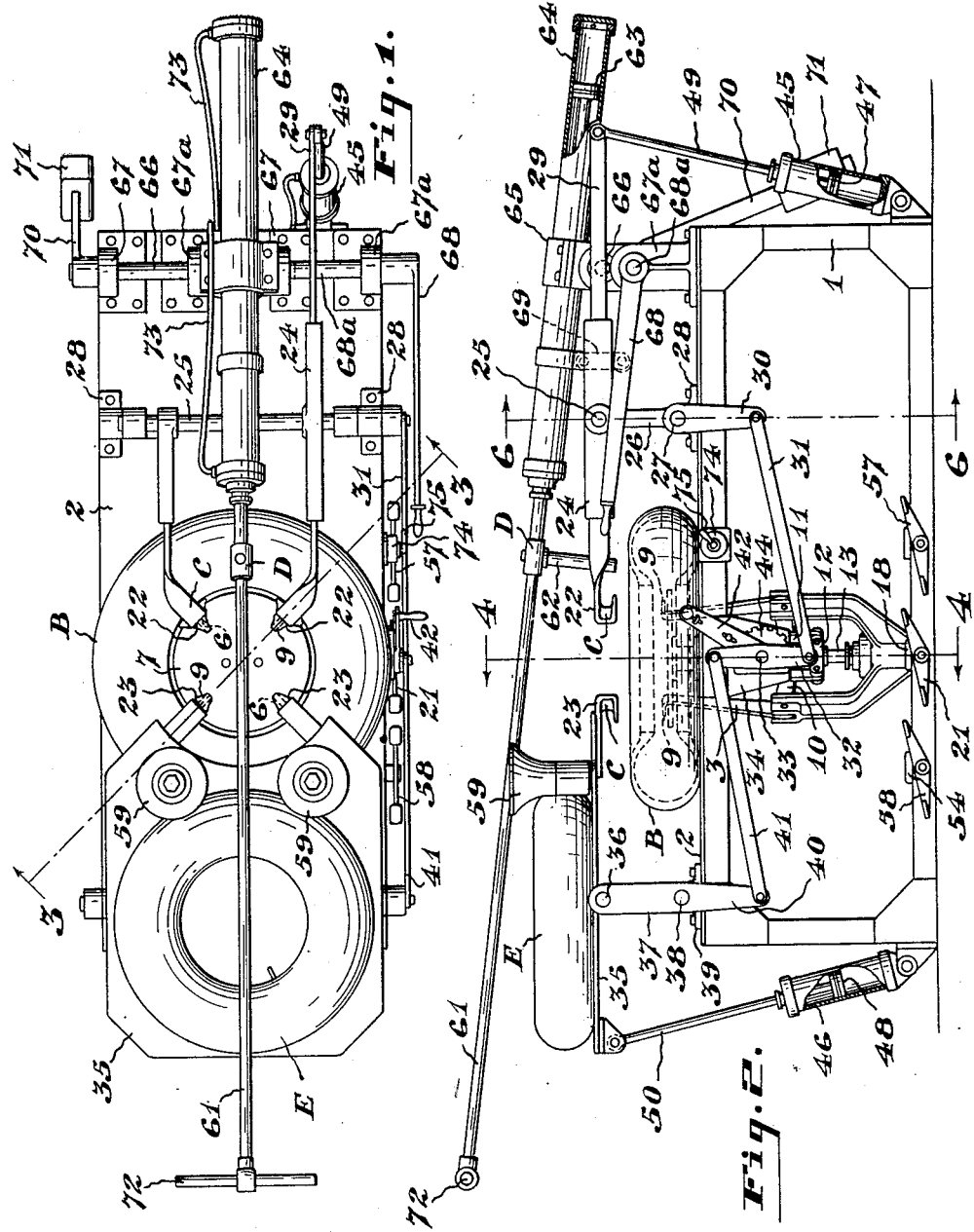

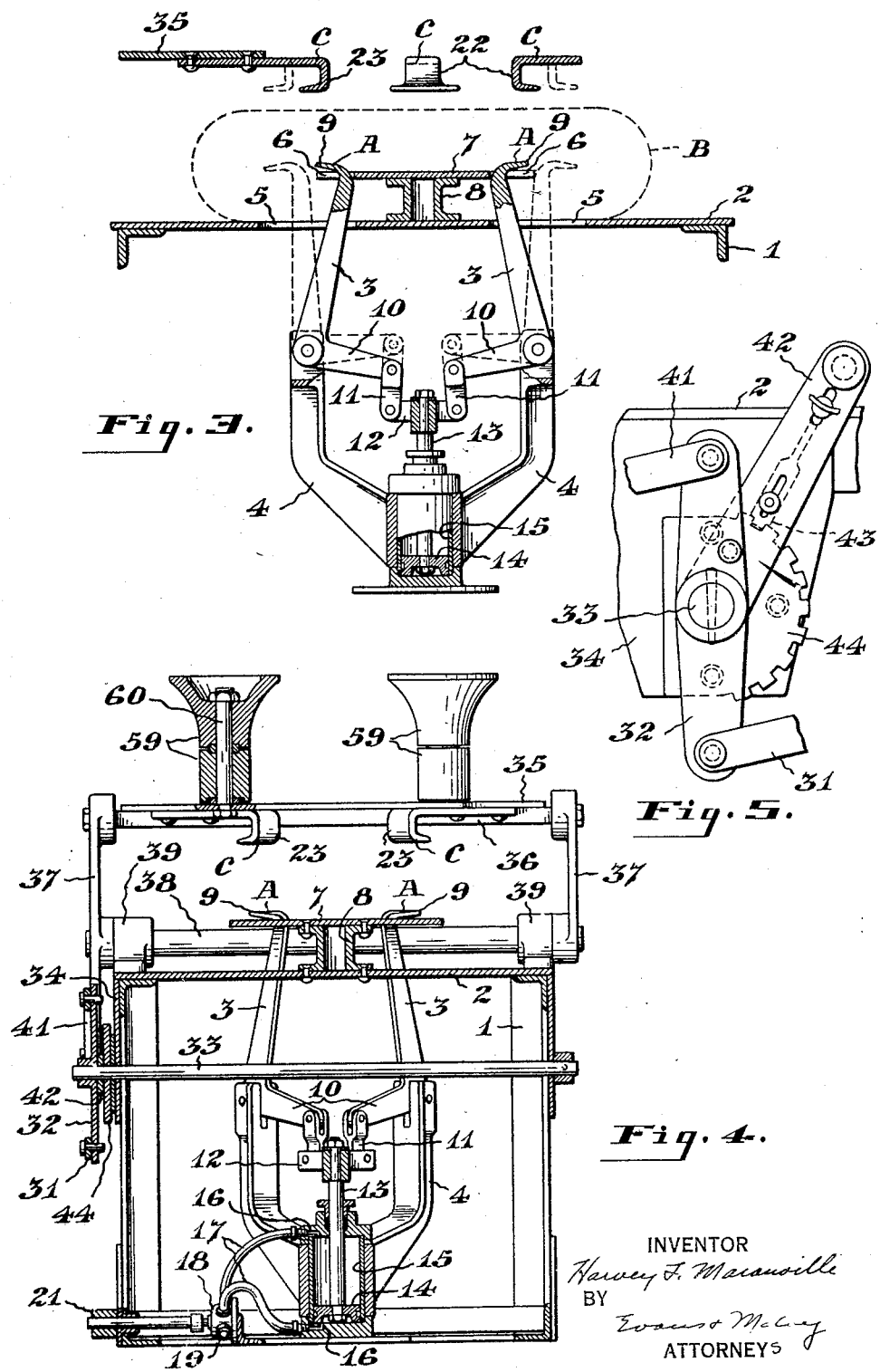

INVENTOR
Harvey F. Maranville
BY
Evans + McCoy
ATTORNEYS

March 1, 1932. H. F. MARANVILLE 1,847,349
AIRBAG INSERTING MACHINE
Filed May 10, 1930 4 Sheets-Sheet 4
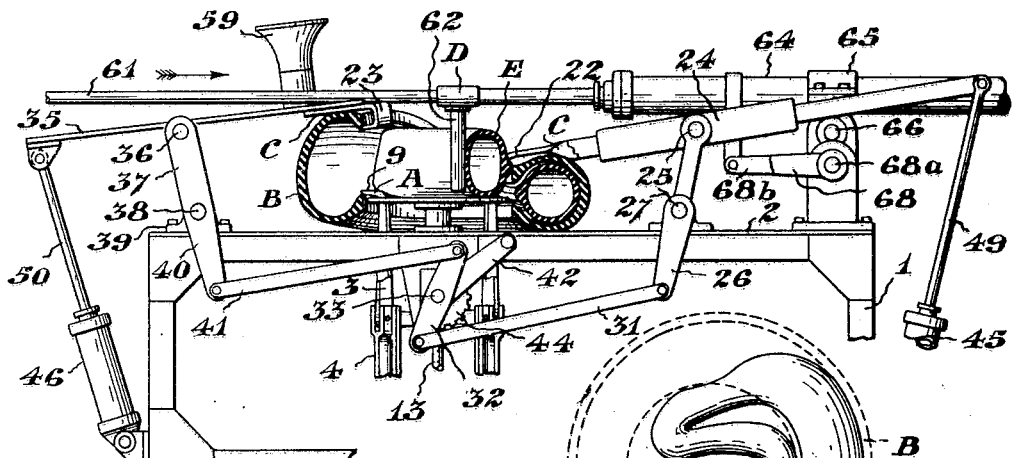
Fig. 9.
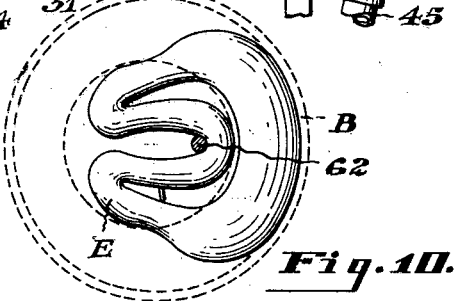
Fig. 10.
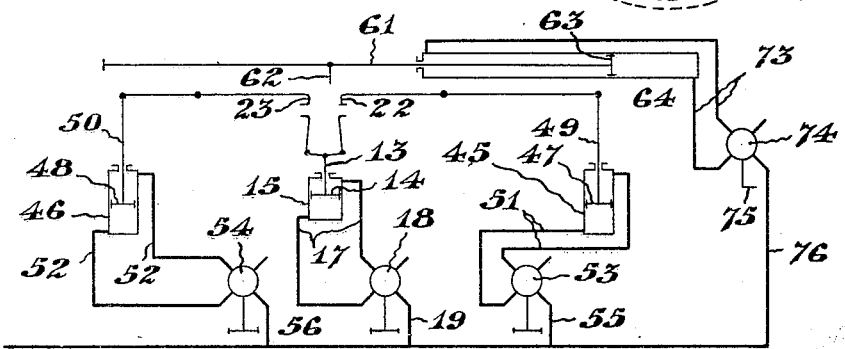
Fig. 11.
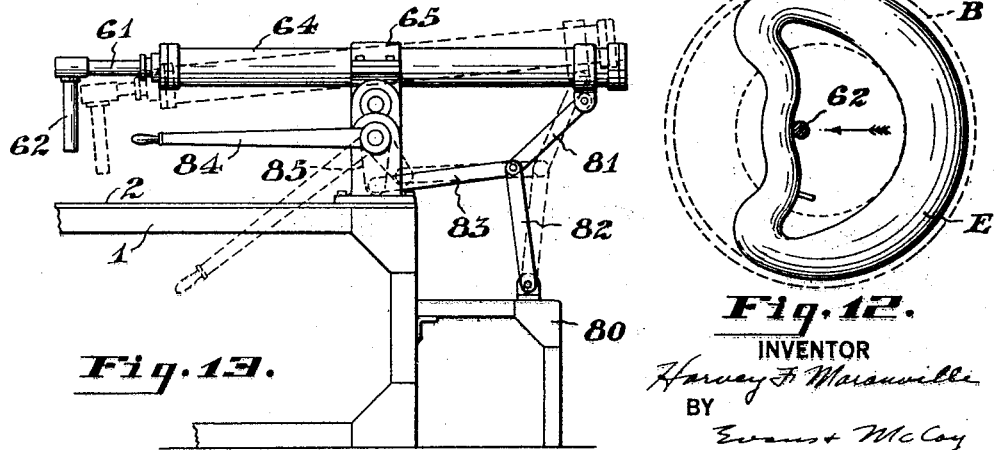
Fig. 13.
Fig. 12.
INVENTOR
Harvey F. Maranville
BY
Evans + McCoy
ATTORNEYS Patented Mar. 1, 1932

1,847,349

UNITED STATES PATENT OFFICE

HARVEY F. MARANVILLE, OF AKRON, OHIO, ASSIGNOR TO THE GENERAL TIRE & RUBBER COMPANY, OF AKRON, OHIO, A CORPORATION OF OHIO

AIRBAG INSERTING MACHINE

Application filed May 10, 1930. Serial No. 451,265.

This invention relates to an airbag inserting machine for use in the manufacture of pneumatic tires.

Large tires, such as those of the type used for trucks, busses and the like, have relatively rigid side walls of considerable radial depth, and the assembly of the conventional airbag in such a tire is a very difficult feat and oftentimes requires a considerable length of time to properly insert the airbag in the tire casing.

Heretofore, it has been the practice to manually insert an airbag of the continuous type in the casing, or to employ complicated and cumbersome machines. In the use of machines it has been the practice to fold the airbag mechanically into a number of loops, and then pass the tire casing by hand around the airbag while the bag is so folded. Handling the casing in this way requires a great expenditure of energy, both for raising them from the floor and placing them on the bag, and for spreading the bead portions. In the case of the larger tire casings, the above manual and mechanical methods are very unsatisfactory, since the airbag, even when folded, is too large to permit the passage of the casing around it without the exercise of considerable pressure.

The present invention contemplates minimizing the difficulties and disadvantages encountered in the above prior practices and one of the objects of the present invention is to provide mechanical means for inserting airbags into tire casings which eliminates the necessity of employing skilled workmen to do such work.

Another object of the present invention is to provide mechanical apparatus for assembling airbags in pneumatic tire casings, whereby the airbags may be inserted into the casings with great ease and in a relatively short time.

Another object is to provide an airbag inserting machine of such construction that a single operator can assemble airbags in tire casings with greater ease and in a considerably shorter time than has ever been possible in any of the known prior methods.

Another object is to provide apparatus whereby the tire casing is mechanically spread open and whereby the airbag is mechanically inserted into the casing.

A further object is to provide an airbag inserting machine for use in the manufacture of pneumatic tires whereby the airbag used during vulcanization of the tire is mechanically inserted first into one side of the tire casing and then into the other side thereof in a very short time without the use of skilled manual labor.

With the foregoing and other objects in view, which will be apparent from the detailed description to follow, this invention consists in certain novel features of construction and combinations of parts which will be readily understood by those skilled in the tire-building art.

In the drawings, which illustrate one suitable embodiment of the invention;

Figure 1 is a plan view of the airbag inserting machine, portions of the same being broken away and shown in section, an airbag being shown in position ready to be inserted in a tire casing;

Fig. 2 is a side elevation of the apparatus shown in Fig. 1, the various parts thereof being shown in normal inoperative position;

Fig. 3 is an enlarged section taken on the line 3—3 of Fig. 1, showing the means for holding the tire casing stationary during the inserting operation;

Fig. 4 is an enlarged section taken on the line 4—4 of Fig. 2, showing the airbag guiding rolls, one being in section, and showing the means for actuating the tire casing spreaders;

Fig. 5 is an enlarged side elevation of the ratchet mechanism for actuating the tire casing spreaders;

Fig. 9 is a side elevation of the airbag inserting machine, showing the bag inserted in one side of the tire casing and in the process of being collapsed prior to insertion into the other side thereof;

Fig. 10 is a diagrammatic plan view of the respective positions of the tire casing and airbag in the step shown in Fig. 9;

Fig. 11 is a diagrammatic view of the piping and controls for the machine of the present invention;

Fig. 12 is a diagrammatic plan view of another step in the operation of inserting the airbag into a tire casing;

Fig. 13 is a fragmentary side elevation of a modified type of manual actuating means for the airbag pulling member.

Figure 6:
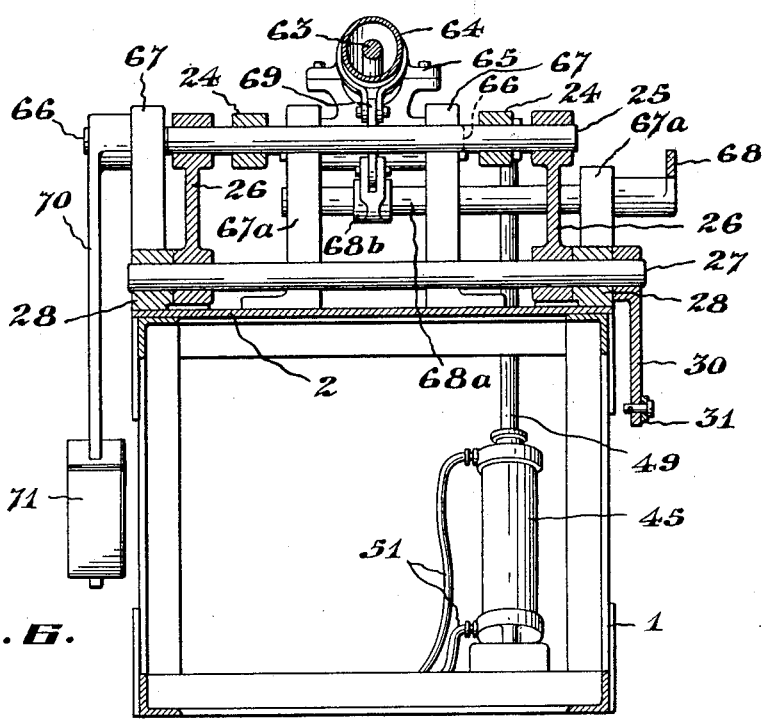
Fig. 6 is an enlarged transverse section taken on the line 6—6 of Fig. 2.

Referring to the accompanying drawings, in which like numerals refer to like parts throughout the several views, the apparatus of the present invention comprises, in general, means A holding the tire casing B in position during insertion of the airbag E, spreaders C for spreading or moving the tire beads of the tire casing B away from each other, and mechanical means D for inserting the airbag E into the casing B while the tire beads are held in the proper spaced relationship by the spreaders C.

The apparatus above referred to is supported on a suitable skeleton framework 1 preferably having its top side covered with a suitable plate to provide a work table 2 which supports the tire casing B during the operation of inserting the airbag E thereinto.

The tire casing is held in position on the work table 2 by the holding means A above referred to, which comprises a plurality of bell cranks pivoted to a suitable support 4 disposed beneath the work table 2. These bell cranks are arranged about the axis of the support 4 substantially 90 degrees apart and the longer arms 3 thereof extend upwardly through slots 5 formed in the work table 2. The upper ends of the arms 3 are disposed above the surface of the work table and are guided in radial slots 6 formed in a horizontally arranged plate 7 spaced above the work table 2 by means of a support 8 secured to the work table. The ends of the upwardly extending arms 3 are formed with outwardly extending fingers 9, which, when the arms 3 are pivoted outwardly to engage the lower tire bead to prevent lateral shifting of the casing as shown in dotted position in Fig. 3, extend outwardly above the inner side of the lower tire bead to hold the side of the tire casing adjacent the work table 2 from substantial axial displacement. The shorter arms 10 of the radially arranged bell cranks extend inwardly toward their common center and are provided with links 11 pivoted thereto, which links in turn are pivoted to a vertically movable actuating plate 12. The actuating plate 12 is mounted on a rod 13 that is secured to a piston 14 which is adapted to reciprocate in a suitable cylinder 15. The cylinder 15 is rigidly carried by the central support and is provided with ports 16 at its opposite ends for the alternate admission thereto and discharge therefrom of a suitable actuating medium. As shown in the drawings, the piston is arranged to be actuated by compressed air, although any other suitable means may be employed.

As shown diagrammatically in Fig. 11, the ports 16 are connected through suitable conduits 17 to a four-way valve 18 which is connected by a conduit 19 to an air pressure supply line. By placing the valve control lever 21 at one position, air is admitted into the cylinder 15 at the lower side of the piston 14, to move the piston upwardly to thereby move the bell crank arms 3 to their operative positions shown in Figs. 7 and 9. The bell crank arms 3 are moved to their inoperative positions shown in Figs. 2 and 3 by placing the valve control lever 21 at another position which permits air to enter the cylinder at the upper side of the piston and move the piston downwardly to the position shown in Fig. 3.

The upper bead of the tire casing B is moved away from the lower bead thereof to permit the insertion of the airbag thereinto by the separators C. The separators comprise a pair of hook portions 22 and a pair of hook portions 23 which are arranged to first engage the upper tire bead and to then raise the tire bead away from the lower bead in the manner indicated in Figs. 7 and 9. The hooks 22, as shown in Figs. 1 and 2, are mounted on arms 24 that are rigidly secured to a shaft 25. The shaft 25 is pivotally journaled in the ends of a pair of spaced levers 26 that are secured to a shaft 27 which is pivotally mounted on the frame 1 by means of suitable bearings 28. One of the arms 24 is formed with a rearwardly extending portion 29 which is arranged to be raised and lowered by means to be later described. The shaft 27 is arranged to pivot about its axis to impart a longitudinal movement to the arms 24, by a lever 30 secured thereto, which is connected to an actuating link 31. The actuating link 31 is pivotally attached to the lower end of a bell crank 32 mounted on a shaft 33 which is carried on the frame 1 by means of suitable brackets 34.

The pair of hook portions 23 are rigidly secured to a pivoted airbag supporting plate 35 which is tiltable about its central axis by means to be later described and which is shiftable in a longitudinal direction. This supporting plate is mounted intermediate its ends on a shaft 35, the ends of which are pivotally journaled in the ends of upright levers 37 that are secured to a shaft 38. The shaft 38 is pivoted in bearings 39 carried by the frame 1 and is pivoted by means of a depending portion 40 which is connected through a connecting link 41 to the upper end of the bell crank 32 previously referred to. The bell crank shaft 33 is rotated by a lever 42 secured thereto which has a spring pressed pawl 43 that is engageable with a stationary ratchet plate 44. Rotation of the shaft 33 causes the separators C to move toward and away from each other, as will be later described.

The shafts 25 and 36 are pivotally mounted to lower the hook portions 22 and 23 to the plane of the uppermost tire bead, and this is accomplished by providing fluid pressure cylinders 45 and 46 which respectively have reciprocable pistons 47 and 48 therein, and which are pivoted to the ends of the frame 1 near the bottom thereof. The piston 47 in the cylinder 45 is provided with a piston rod 49 which is pivoted at its end to the rearwardly extending portion 29 of the lever 24, and the piston 48 of the cylinder 46 is provided with a piston rod 50 which is pivoted to the rear end of the airbag supporting plate 35.

As shown in Fig. 11, the cylinders 45 and 46 are respectively provided with conduits 51 and 52 for their opposite ends which lead to suitable four-way valves 53 and 54 respectively, which in turn are connected through conduits 55 and 56 to the air pressure supply conduit 20. The valves 53 and 54 are preferably provided with operating levers 57 and 58, which may be shifted to the correct position by the operator's foot.

In the operation of the separators C, the valves 55 and 56 are so operated that the hooks 22 and 23 are lowered so that their reversely bent portions lie below the plane of the uppermost tire bead. When this is done, the shaft 33, as viewed in Fig. 2, is rotated by the ratchet handle 42 in a clockwise direction, thus causing the hooks 22 and 23 to simultaneously move away from each other and surround the uppermost tire bead. Then, for example, the valve 55 is again actuated by the foot lever 57 to permit air under pressure to enter the upper side of the cylinder 45 above the piston 47 to move the piston downwardly and thus at the right side of the tire, as viewed in Fig. 7, to move the upper tire bead away from the lower tire bead to provide sufficient space for the insertion of the airbag E.

The airbag E is supported on the supporting plate 35 and while being inserted in the one side of the tire casing is elongated by drawing it between a pair of spaced rolls 59. Each roll is preferably mounted on ball bearings to rotate about a shaft portion 60 secured perpendicular to the plane of the supporting plate 35 and the upper end of each roll is gradually flared outwardly to prevent the airbag from becoming displaced while it is being drawn between the rolls 59. If desired, the rolls may be formed of two parts, as shown in Fig. 4.

The airbag inserting means D comprises a shaft or bar 61 extending longitudinally of the machine midway between the axes of the guide rolls 59 and a depending puller pin 62 adjustably secured thereto. The bar 61 is arranged for longitudinal reciprocation diametrically over the tire casing and also to swing in a vertical plane about the end opposite the end of the machine supporting the airbag. This bar is secured at one end to a piston 63 which is reciprocably mounted in a fluid pressure cylinder 64, the cylinder 64 being secured by means of a suitable clamp 65 to a rotatable shaft 66. This shaft 66 is journaled at its ends in suitable supports 67 secured to the end of the machine opposite that end over which the airbag is supported. The cylinder 64 and bar 61 are tilted about the shaft 66 as an axis by a lever 68 secured to a shaft 68a mounted in supports 67a. An arm 68b is secured to the shaft 68a which in turn is connected by a pivoted link 69 to the cylinder 64, as shown in Figs. 2 and 6. In order to facilitate the raising and lowering of the cylinder, an arm 70 having a counterweight 71 at its outer end is attached to one end of the shaft 66. The bar 61 may extend beyond the airbag supporting plate 35 if desired and be provided with a handle 72 at its end which may be grasped to raise and lower the same.

The piston 63 is preferably reciprocated in the cylinder 64 by compressed air and the cylinder is provided with a pair of conduits 73 leading from its ends to a suitable four-way valve 74 having an actuating handle 75 mounted on the side frame 1 near the tilting handle 68, the valve 74 in turn being connected through a conduit 76 to the air pressure supply line 20. It is obvious that the bar 61 and puller pin 62 may be reciprocated by alternately admitting air to the ends of the cylinder through the correct positioning of the control valve 74.

In the operation of inserting an airbag E within the tire casing B, the casing is placed in a horizontal position on the work table 2 with the bell cranks or holding means A extending into the opening of the tire casing, and the airbag E is placed on the supporting plate 35 adjacent the guide rolls 59. The relative position of the parts of the apparatus, the tire casing and airbag, are shown at this stage in Figs. 1 to 4, inclusive.

The next step of operation consists in holding the tire against substantial movement and in order to do this, the control lever 21 is moved, which opens the valve 18 and allows air to enter the cylinder 15 at the lower side of the piston 14. The piston moves upwardly in the cylinder and thus causes the longer portions 3 of the bell cranks to abut against the inner edge of the lowermost tire bead and the fingers 9 to extend within the tire casing beyond the lowermost bead to prevent lateral shifting of the tire casing and to prevent substantial vertical movement of the lowermost tire bead.

The airbag is inserted first into one side of the tire casing and then into the other side and, to do this, the separators C are brought into operation. The foot control levers 57 and 58 are first actuated, which, through the medium of the medium previously described, pivots the hook portions 22 and 23 downwardly until the reversely bent portions lie below the plane of the uppermost tire bead. The hooks are then caused to engage the tire bead by actuating the ratchet lever 42, which simultaneously moves the hook portions 22 and 23 away from each other and, when the desired position of the hook portions is reached, the pawl 43 is engaged with the ratchet plate 44 to prevent retraction of the hook portions 22 and 23. During the next step in operation the hook portions 22 are raised to the position shown in Fig. 7, by actuating the valve foot pedal 57.

Figure 8:
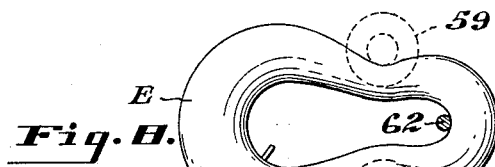
Fig. 8 is a plan view illustrating the elongated position of the airbag as it is being drawn through the guide rolls.
Figure 7:
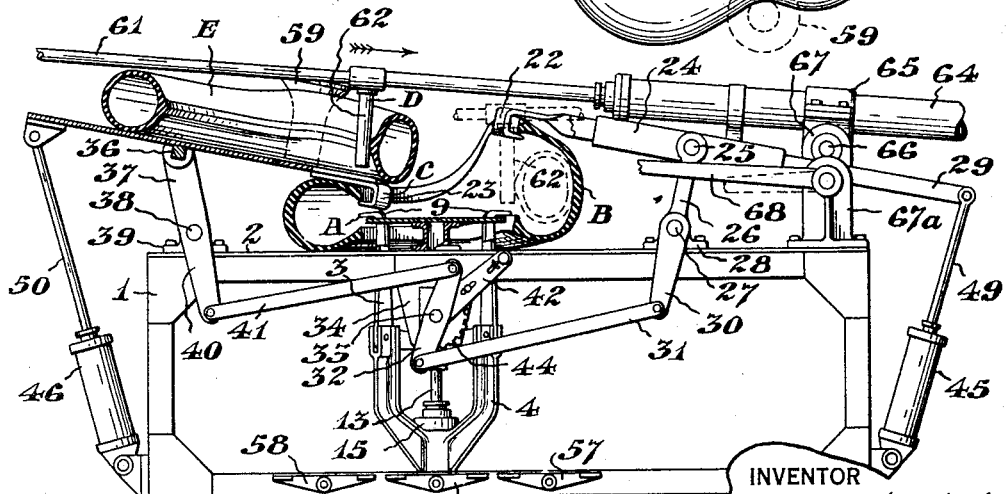
Fig. 7 is a partially sectional view similar to Fig. 2 showing the tire spreaders in operative position and the airbag being drawn through the guide rolls.

The control valve 74 is next actuated, which moves the bar 61 longitudinally toward the airbag and when the depending puller pin 62 is at a position beyond the inner circumference of the airbag the supply of compressed air to the cylinder 64 is shut off. The bar 61 is then pulled downwardly by actuating the lever 68 or handle 72, until the puller pin 62 is in position to engage the airbag at a point on its inner circumference midway between the guide rolls 59. The bar 61 is then caused to move in the opposite direction and the puller pin 62 draws the airbag downwardly at an angle on the plate 35 between the guide rolls 59, as shown in Figs. 7 and 8, which materially elongates and decreases the width of the same, so that a portion thereof is moved directly into the one side of the tire casing between the separated tire beads, as shown in broken outline in Fig. 7.

The hook portions 22 are then allowed to swing downwardly again, so that the tire beads will tend to hold the inserted portion of the airbag in place, and the bar 61 and puller pin 62 are raised and extended so that the puller pin can engage the airbag at a point on its outer circumference and fold the bag, as shown in Figs. 9 and 10. The airbag supporting plate 35 is then tilted through the proper manipulation of the control valve 54 which separates the adjacent portions of the tire beads at that side of the tire, as shown in Fig. 9, so that the airbag can be inserted therein. At this stage of the operation the puller pin 62 is again raised out of engagement with the airbag, so that further portions of the airbag may automatically expand into the tire casing.

Finally, the puller pin 62 is positioned against the folded portion of the airbag, which will not move into the tire carcass of itself, and the bar 61 is again extended with respect to the cylinder 64 to completely push this remaining folded portion of the airbag into the casing. This step is diagrammatically shown in Fig. 12.

As described above and shown in Fig. 9, the hook portions 22 are shown in lowered position, while the airbag is being inserted into the opposite side of the tire casing. In cases where the tire beads are very rigid, it may be desirable to raise that portion of the bead enclosed by the hook portions 22, while the airbag is being inserted into the opposite side of the tire casing. In this instance the tire beads would be spaced a distance apart greater than the thickness of the airbag around their entire circumference.

In Fig. 13 a modified means for tilting the cylinder 64 and bar 61 is shown, which provides a construction wherein the counterweight may be eliminated. In this construction the cylinder is pivotally mounted in the same way as previously described, but it is tilted by a toggle arrangement which gives considerably more leverage than the construction previously described. The rear end of the cylinder 64 is connected to an auxiliary frame 80 by a pair of links 81 and 82 which are pivoted together, the link 81 being pivoted to the cylinder 64 and the link 82 being pivoted to the auxiliary frame 80. The operating lever 84 is pivoted to one of the cylinder supports 67 and is provided with an arm 85 having a link 83 pivoted thereto, which arm 85 is also connected to the connection between the links 81 and 82. By actuating the lever 84, the link 83 causes the links 81 and 82 to tilt the cylinder 64 in the desired direction.

The present invention provides a novel apparatus for assembling airbags of tire casings prior to vulcanization, which permits the airbags to be assembled to the tire casings with greater ease in a lesser time than is possible with the manual method of assembly now in use.

The apparatus just described is particularly adapted to the inserting of airbags into heavy duty tires of relatively large size, such as those used on heavy trucks and busses, because of the mechanical means for separating the tire beads and inserting the airbag, which obviates the disadvantages and difficulties encountered in the insertion methods which heretofore have been used. The arrangement of the head separating mechanism is such that the machine can be used to insert airbags in a large range of sizes of tire casings.

The cost of airbag assembly is materially lessened by the use of the present invention because of the fact that skilled labor is not required and because of the relatively short length of time required to insert the airbag into the tire casing.

Aside from the specific embodiments of the invention herein shown and described, it will be understood that numerous minor details of the construction may be altered or omitted without departing from the spirit and scope of this invention, and I do not desire to limit the invention to the exact construction herein set forth, as I desire to claim my invention broadly as well as specifically, as indicated in the appended claims.

What I claim is:

1. Apparatus for assembling airbags into pneumatic tire casings comprising means for spreading the casing at the beads to provide a relatively wide space therebetween, means for first moving one side and then the other side of the airbag through said space into position in the casing while said beads are held in separated position, and means for guiding the airbag into said space.

2. Apparatus for assembling airbags into pneumatic tire casings comprising means for spreading the casing at the beads to provide a relatively wide space therebetween, means for first moving one side and then the other side of the airbag through said space into position in the casing while said beads are held in separated position, and means for simultaneously collapsing and guiding the airbag into said space.

3. Apparatus for assembling airbags into pneumatic tire casings comprising means for spreading the casing at the beads to provide a relatively wide space therebetween, means for first moving one side and then the other side of the airbag through said space into position in the casing while said beads are held in separated position, and means for holding the tire against lateral shifting during the insertion of the airbag into said space.

4. Apparatus for assembling airbags into pneumatic tire casings comprising means for spreading the casing at the beads to provide a relatively wide space therebetween, means for first moving one side and then the other side of the airbag through said space into position in the casing while said beads are held in separated position, means for holding the tire against lateral shifting during the insertion of the airbag into said space, and means for simultaneously collapsing and guiding the airbag into said space.

5. Apparatus for assembling airbags into pneumatic tire casings comprising means for holding the casing against lateral movement having means thereon preventing substantial axial movement of one of the tire beads, means for moving portions of the other of the tire beads away from the first mentioned bead to provide a relatively wide space therebetween, and means for independently moving different portions of the airbag into said casing through said space.

6. Apparatus for assembling airbags into pneumatic tire casings, comprising means for separating the tire beads at one side of the casing, inserting means for pulling the airbag over the other side of the casing and inserting one side of the same into position in the casing between the separated beads, said inserting means being arranged to then collapse the other side of the airbag to clear the adjacent side of the tire beads, and means for separating the tire beads at the other side of the casing, whereby the airbag may be completely inserted into position in the tire casing.

7. Apparatus for assembling airbags into pneumatic tire casings, comprising means for separating the tire beads at one side of the casing, inserting means for pulling the airbag over the other side of the casing and inserting one side of the same into the casing between the separated beads, said inserting means being arranged to then collapse the other side of the airbag to clear the adjacent side of the tire beads, and means for separating the tire beads at the other side of the casing, said inserting means then being arranged to force the last mentioned side of the airbag into position in the casing between the portions of the tire beads last separated.

8. Apparatus for assembling airbags into pneumatic tire casings, comprising means for separating the tire beads at one side of the casing, inserting means for pulling the airbag over the other side of the casing and inserting one side of the same into the casing between the separated beads, elongating means through which the airbag is drawn by said inserting means, said inserting means being arranged to the collapse the other side of the airbag to clear the adjacent side of the tire beads, and means for separating the tire beads at the other side of the casing, whereby the airbag may be completely inserted into the tire casing.

9. Apparatus for assembling airbags into pneumatic tire casings, comprising means for separating the tire beads at one side of the casing, inserting means for pulling the airbag over the other side of the casing and inserting one side of the same into the casing between the separated beads, elongating means through which the airbag is drawn by said inserting means, said inserting means being arranged to then collapse the other side of the airbag to clear the adjacent side of the tire beads, and means for separating the tire beads at the other side of the casing, said inserting means then being arranged to force the last mentioned side of the airbag into position in the casing between the portions of the tire beads last separated.

10. Apparatus for assembling airbags into pneumatic tire casings, comprising means for separating the tire beads at one side of the casing, inserting means for pulling the airbag over the other side of the casing and inserting one side of the same into the casing between the separted beads, means for simultaneously elongating the airbag and guiding said side into said tire casing, said inserting means being arranged to then collapse the other side of the airbag to clear the adjacent side of the tire beads, and means for separating the tire beads at the other side of the casing, whereby the airbag may be completely inserted into position in the tire casing.

11. Apparatus for assembling airbags into pneumatic tire casings comprising a work table for supporting a tire casing in a horizontal plane, means for holding the casing against lateral movement having means thereon preventing substantial axial movement of the lowermost tire bead, means for moving the uppermost tire bead away from the lowermost tire bead at one side only of said tire to provide a relatively wide space therebetween, and inserting means for drawing the airbag over the other side of the tire casing and inserting one side only thereof into said space.

12. Apparatus for assembling airbags into pneumatic tire casings comprising a work table for supporting a tire casing in a horizontal plane, means for holding the casing against lateral movement having means thereon preventing substantial axial movement of the lowermost tire bead, means for moving the uppermost tire bead away from the lowermost tire bead at one side only of said tire to provide a relatively wide space therebetween, inserting means for drawing the airbag over the other side of the tire casing and inserting one side only thereof into said space, said inserting means then being arranged to collapse the other side of the airbag to clear the adjacent side of the tire beads, and means for moving the uppermost tire bead away from the lowermost tire bead at the other side of the tire casing to provide a relatively wide space therebetween, whereby the remainder of the airbag may be inserted into the tire casing.

13. Apparatus for assembling airbags into pneumatic tire casings comprising a work table for supporting a tire casing in a horizontal plane, means for holding the casing against lateral movement having means thereon preventing substantial axial movement of the lowermost tire bead, means for moving the uppermost tire bead away from the lowermost tire bead at one side only of said tire to provide a relatively wide space therebetween, and inserting means for drawing the airbag over the other side of the tire casing and inserting one side only thereof into said space, said inserting means then being arranged to collapse the other side of the airbag to clear the adjacent side of the tire beads, and means for moving the uppermost tire bead away from the lowermost tire bead at the other side of the tire casing to provide a relatively wide space therebetween, said inserting means also being arranged to move the remainder of the airbag into the tire casing.

14. Apparatus for assembling airbags into tire casings comprising a support for a tire casing, means for supporting an airbag above the plane of the casing and adjacent one side thereof, a pair of spaced members on said means of materially less distance apart than the diameter of the casing, means for separating the tire beads at the side opposite said airbag supporting means, and means for drawing the airbag between said spaced members to elongate and to move a portion of the airbag into the tire casing between the separated tire beads.

15. Apparatus for assembling airbags to tire casings, comprising a support for a tire casing, inclined means for supporting an airbag adjacent to and above one side of the tire casing, spaced airbag elongating members on said inclined means of lesser distance apart than the diameter of the airbag, means for separating the beads of the tire at the side opposite said inclined means, means movable diametrically across the tire for drawing the airbag between said spaced elongating members and moving a portion of the airbag through said space into said tire casing, and means for separating the tire beads at the other side thereof, whereby the remainder of the airbag may be inserted into the tire casing.

16. An airbag inserting machine comprising a horizontal support having means thereon for engaging the lowermost bead of a tire casing, a table adjacent one side of and above the plane of the tire casing for supporting an airbag, means engageable with the uppermost tire bead at the side opposite said table for spacing the bead away from the lowermost tire bead a sufficient distance to permit insertion of the airbag, means reciprocable diametrically across the tire casing for drawing one side of the airbag into the tire casing between the spaced beads and for then collapsing the airbag, and means for spacing the opposite side of the uppermost tire bead from the lowermost tire bead to permit the remainder of the airbag to be inserted in the tire casing.

17. An airbag inserting machine comprising a single means diametrically reciprocable across the tire casing for inserting one side of an airbag into one side of the casing, for elongating the airbag and for inserting the other side of the airbag into the adjacent side of the tire casing, means for separating the tire beads at one side of the casing to permit one portion of the airbag to be inserted therebetween, and means for thereafter separating the tire beads at the other side of the tire casing to permit the remainder of the airbag to be inserted into the casing.

18. In an airbag inserting machine, a horizontal support for a tire casing, means engageable with the lowermost bead of the tire casing to prevent substantial movement thereof, means reciprocable over the tire casing to engage the uppermost bead thereof at one side of the casing only, said means being tiltable to space the uppermost bead away from the lowermost bead, and means reciprocable over the other side of the tire casing to engage the uppermost tire bead, said last mentioned means also being tiltable to space that side of the tire bead away from the lowermost tire bead.

19. An airbag inserting machine comprising a horizontal support for a tire casing, means engageable with the lowermost bead of the casing to prevent substantial movement thereof, means reciprocable over the casing to engage the uppermost tire bead and tiltable to space the bead from the lowermost tire bead at one side only, a rod member diametrically reciprocable over the tire casing, and a depending puller pin on said rod member for engaging an airbag at a point on its inner circumference and drawing the same toward said tire casing to insert a portion thereof through said spaced means into said casing.

20. An airbag inserting machine comprising a horizontal support for a tire casing, means engageable with the lowermost bead of the casing to prevent substantial movement thereof, means reciprocable over the casing to engage the uppermost tire bead and tiltable to space the bead from the lowermost tire bead at one side only, a rod member diametrically reciprocable over the tire casing, and a depending puller pin on said rod member for engaging an airbag at a point on its inner circumference and drawing the same toward said tire casing to insert a portion thereof through said spaced means into said casing, said rod member being vertically tiltable to permit engagement of said puller pin with said airbag.

21. An airbag inserting machine comprising a horizontal support for a tire casing, a support for an airbag above one side of said casing and being inclined toward the opposite side of said casing, means for separating the tire beads at said last mentioned side only to provide a relatively wide airbag receiving opening therebetween, rod means diametrically reciprocable over said casing, and a depending puller pin on said rod member arranged to engage the airbag at a point on its inner circumference and, upon movement of said rod member toward said last mentioned side of the tire casing, to draw a portion of the airbag at an angle toward and into said casing between the separated tire beads.

22. An airbag inserting machine comprising horizontal support for a tire casing, a support for an airbag above one side of said casing and being inclined toward the opposite side of said casing, means for separating the tire beads at said last mentioned side only to provide a relatively wide airbag receiving opening therebetween, rod means diametrically reciprocable over said casing, and spaced means on said airbag support for elongating the airbag as it is drawn from said support.

23. An airbag inserting machine comprising a horizontal support for a tire casing, a tiltable support for an airbag above one side of said casing and being inclined toward the opposite side of said casing, means for separating the tire beads at said last-mentioned side only to provide a relatively wide airbag receiving opening therebetween, rod means diametrically reciprocable over said casing, and a depending puller pin on said rod member arranged to engage the airbag at a point on its inner circumference and upon movement of said rod member toward said last mentioned side of the tire casing, to draw a portion of the airbag at an angle toward and into said casing between the separated tire beads, said puller pin being arranged to engage the airbag on its outer circumference and draw the same toward the inserted side whereby said support may be tilted to separate the tire beads at that side of the tire casing, thereby to permit the insertion of the remainder of the airbag into said tire casing.

24. An airbag inserting machine comprising a horizontal support for a tire casing, a tiltable support for an airbag above one side of said casing and being inclined toward the opposite side of said casing, means for separating the tire beads at said last mentioned side only to provide a relatively wide airbag receiving opening therebetween, rod means diametrically reciprocable over said casing, and a depending puller pin on said rod member arranged to engage the airbag at a point on its inner circumference and, upon movement of said rod member toward said last mentioned side of the tire casing, to draw a portion of the airbag at an angle toward and into said casing between the separated tire beads, said puller pin being arranged to engage the airbag on its outer circumference and draw the same toward the inserted side whereby said support may be tilted to separate the tire beads at that side of the tire casing, said puller then being arranged to engage the inwardly drawn portion of the airbag at a point on its inner circumference and force the remainder of the same into the tire casing.

25. In an airbag inserting machine, a support for a tire casing, means for engaging and holding the lowermost tire bead against substantial movement, a pair of members at opposite sides of the tire casing, each having hook portions thereon, means for simultaneously moving said members away from each other to engage said hook portions with the uppermost tire bead at opposite sides thereof, and independent means for tilting said members away from the tire casing to raise one or both sides of the uppermost tire bead away from the lowermost tire bead to provide an airbag receiving space.

26. In an airbag inserting machine, a support for a tire casing, means for engaging and holding the lowermost tire bead against substantial movement, a pair of members at opposite sides of the tire casing, each having hook portions thereon, means for simultaneously moving said members away from each other to engage said hook portions with the uppermost tire bead at opposite sides thereof, and independent means for tilting said members away from the tire casing to raise one or both sides of the uppermost tire bead away from the lowermost tire bead to provide an airbag receiving space, one of said members being arranged to support an airbag.

27. In an airbag inserting machine, a support for a tire casing, means for engaging and holding the lowermost tire bead against substantial movement, a pair of members at opposite sides of the tire casing, each having hook portions thereon, means for simultaneously moving said members away from each other to engage said hook portions with the uppermost tire bead at opposite sides thereof, independent means for tilting said members away from the tire casing to raise one or both sides of said uppermost tire bead away from the lowermost tire bead, one of said members forming an airbag support, and means for drawing the airbag diametrically across the tire from said supporting member and inserting one side thereof into the tire casing between the separated tire beads.

28. In an airbag inserting machine, a support for a tire casing, means for engaging and holding the lowermost tire bead against substantial movement, a pair of members at opposite sides of the tire casing, each having hook portions thereon, pivoted lever arms pivoted to said members, a double ended crank, links connecting said lever arms to said crank, means for oscillating said crank for simultaneously moving said members in opposite directions relative to each other to engage the uppermost tire bead at opposite sides thereof, and independent means for tilting said members and attached hook portions away from the tire casing to raise either or both sides of the tire bead away from the lowermost tire bead.

In testimony whereof I affix my signature.

HARVEY F. MARANVILLE.